June 11, 1968  L. E. HARE  3,387,690

POSITIVE ACTION SPRING CLUTCH

Filed Sept. 29, 1966

INVENTOR
LLOYD E. HARE

BY Joseph R. Spalla
ATTORNEY

United States Patent Office 3,387,690
Patented June 11, 1968

3,387,690
POSITIVE ACTION SPRING CLUTCH
Lloyd E. Hare, West Hartford, Conn., assignor to Litton
Business Systems, Inc., a corporation of New York
Filed Sept. 29, 1966, Ser. No. 582,976
3 Claims. (Cl. 192—26)

ABSTRACT OF THE DISCLOSURE

A positive action wrap spring clutch having a primary spring operative to clutch a driving shaft to an output cam and a secondary spring acting as a governor to prevent the cam from over-running the driving shaft.

---

This invention relates to a positive action wrap spring clutch; more particularly it relates to a positive action spring clutch having primary and secondary clutch springs wherein the secondary spring prevents the output element of the clutch from leading the drive element.

In the conventional spring clutch characterized by a single spring operable to couple a driven shaft to a cam or crank which is operative in each cycle to drive a cyclic mechanism, over-running occurs after the peak load is reached. This over-running results from the fact that the forces, due to springs and inertia, opposing the cam or crank until peak load is reached, reverse after peak load has been reached, and during return to rest accelerate the cam or crank driving it faster than the drive shaft as a cycle is completed. Where a cam output element and follower is employed, the follower has a tendency to bounce repeatedly on the cam surface with resultant noise, vibration, and damage to the cam and associated parts.

Briefly, in accordance with the invention, a clutch having a pair of wrap spring clutches is provided. A first or primary spring is operative to clutch a driven shaft to an output cam which actuates lever mechanism to step, for example, a typewriter carriage in backspace direction when the clutch is cycled in response to depression of a backspace key. The other or secondary spring, which is wound in the same direction and arranged in tandem with the first, acts as a governor to prevent the cam from over-running or leading the driving shaft during the return of cam driven mechanism to rest position as the cycle is completed subsequent to peak load.

Accordingly, one object of the invention is in the provision of a clutch mechanism wherein the output element cannot move faster than the drive element.

Another object of the invention is in the provision of a cyclic clutch mechanism operative to connect power to and to cycle mechanism through a power and return stroke wherein the tendency of the mechanism to accelerate the output element of the clutch is employed to limit its speed to that of the driving element.

A further object of the invention is in the provision of a clutch characterized by a primary and secondary wrap spring to positively control the output element of the clutch throughout a cycle.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
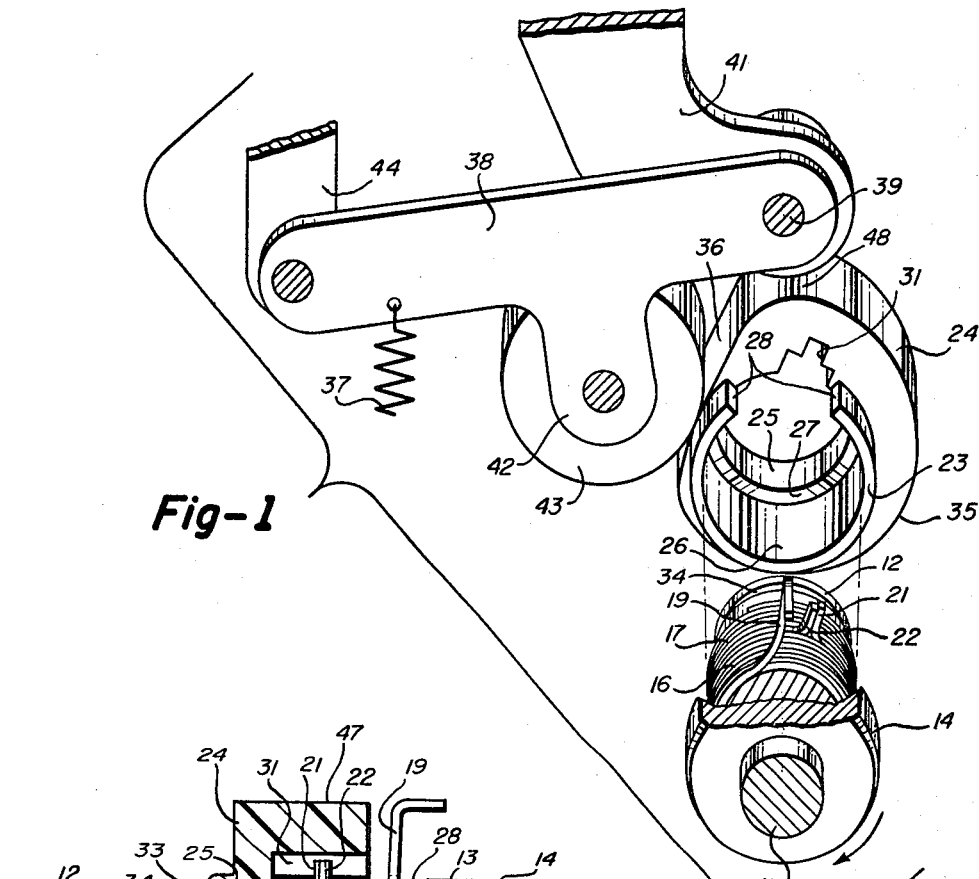
FIGURE 1 is a perspective view of a clutch in accordance with the invention and associated cyclic mechanism driven thereby.
Figure 2:
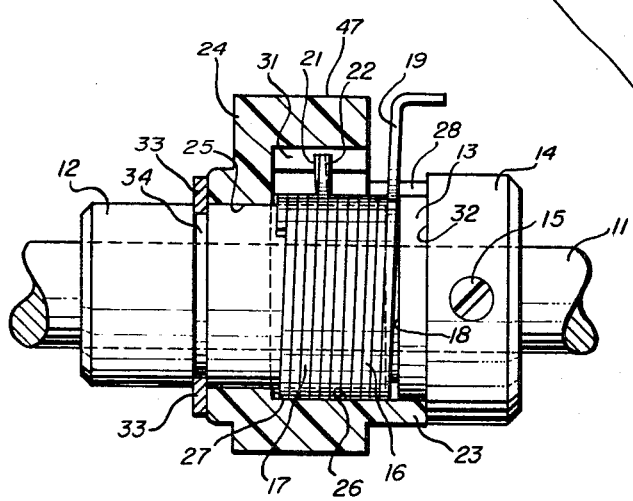
FIGURE 2 is an elevational view of the clutch showing the output cam in section.
Figure 3:
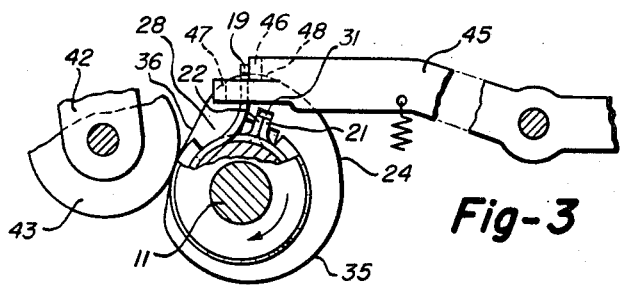
FIGURE 3 is a fragmentary end elevational view showing the clutch actuator.

Referring now to the drawings wherein like reference numerals designate like or corresponding parts throughout the several views and wherein is shown an illustrative embodiment, there is shown in FIGURES 1 and 2 a shaft 11 adapted to be continuously driven in a clockwise direction as viewed in FIGURE 1 from a suitable motive source. Secured to the shaft for rotation therewith is a sleeve body 12 formed toward the right end as viewed in FIGURE 2 with a first enlarged diameter portion 13 and a second larger diameter portion 14 in which a set screw 15 is threaded to lock the sleeve to the shaft. A primary wrap coil spring 16 and a secondary wrap coil spring 17 wound in a counterclockwise direction and having normal internal diameters less than the diameter of the sleeve body 12 are placed end to end over the sleeve with one end coil of the primary spring adjacent the shoulder 18 formed by the first enlarged portion 13 of the sleeve. As viewed in FIGURES 1-3 the end coil of the primary spring adjacent shoulder is bent radially outwardly and its extremity 19 is bent in an axial direction. The other end 21 of the primary spring is also bent radially outwardly as is the adjacent end 22 of the secondary spring such that the bent off end 22 of the secondary spring lies as viewed in FIGURE 2 in front of primary spring end 21 in contacting relationship. Also assembled over and for rotation relative to the sleeve is the output element of the clutch which comprises a circular portion 23 and a contoured portion 24 defining a cam. The inner periphery of the output element has a stepped internal diameter whereby its smaller ID portion 25 may be accommodated by the sleeve body 12 and its larger ID portion 26 may be accommodated by the first enlarged diameter portion 13 of the sleeve. As noted from FIGURE 2 the difference in ID of the output element is provided to accommodate the wrap springs 16 and 17 within the output element between the shoulder 27 formed by the cam and the shoulder 18 formed by the first enlarged portion of the sleeve. The circular portion of the output element is formed with a relatively wide axial slot 28 to accommodate spring end 19 and to permit sufficient angular movement thereof to permit primary spring 16 to wrap and unwrap as will hereinafter appear. The output element is also formed with an axially extending slot 31 in the body of the cam portion to accommodate as viewed in FIGURE 3 the contacting bent off ends 21 and 22 of the primary and secondary springs, which comprise the drive connection to the output element. The output element is held on sleeve body 12 between the shoulder 32 formed by the large diameter portion 13 of the sleeve and by a C-ring 33 secured in a slot 34 formed in the sleeve.

The cam periphery comprises a contoured lift portion 35 and a return portion 36. Associated with the cam periphery and biased thereagainst as by a spring 37 is a cam follower arm 38 pivotally mounted at one end 39 on a machine frame member 41 and provided intermediate its ends with a depending projection 42 which rotatably supports a roller 43 for contact with the cam periphery. Pivotally connected to the other end of the cam follower arm is an output link 44 adapted to drive mechanism such as backspace mechanism of a typewriter through a working stroke; the spring 37 serving to return the mechanism to rest as a cam cycle is completed.

As hereinabove noted the normal diameter of the primary and secondary springs 16 and 17 is less than the diameter of the drive sleeve. Accordingly, to disengage the clutch the springs must be sufficiently unwrapped to permit slippage on the drive sleeve. This is effected by a clutch engagement-disengagement actuator link 45 formed at its ends with upper and lower longitudinally spaced offset stop lugs 46 and 47. The upper lug 46, as viewed in FIGURE 3, normally lies in the wrap path of primary spring end 19, and since the other end of the primary spring is secured to the cam, the rotation of the shaft will cause the primary spring to expand, from right to left as viewed in FIGURE 2, and to maintain the primary spring expanded. Similarly, since the end 22 of the secondary spring is secured to the cam, the rotation of the shaft tends to expand the secondary spring, from left to right as viewed in FIGURE 2, sufficiently to permit slippage on the drive sleeve.

A clutch cycle is effected by rocking the link 45 clockwise thus raising the end of link upward as by depression of a key to remove lug 46 from the offset end 19 of primary spring 16 whereby the latter will wrap about the drive sleeve and drive the cam. As the cam is driven it carries the secondary spring end 22 causing the scondary spring to wrap also. Thus the springs coupled to sleeve will drive the cam from the FIGURE 3 position over a full revolution. As will be understood the clutch will be disengaged at the end of a revolution by the upper or the lower offset lug 46 or 47; the latter if the link 45 is still in the raised position at the end of a cycle. In such instances, upon return of the link 45 to normal, the spring end 19 will be caught by the upper lug 46.

After the high rise point 48 on the cam is passed by the follower, all of the parts driven thereby reverse direction in returning to rest and tend to accelerate the cam and drive it faster than sleeve 12. The forces of acceleration cause the primary spring 16 through its end 21 to unwrap and slip in the direction of drive. However, these same forces cause the secondary spring 17 through its end 22 to wrap more tightly on the drive sleeve and being keyed to the cam, brake or govern and prevent its speed from exceeding the speed of the driven shaft.

It should be understood that the foregoing disclosure relates to only a preferred embodiment of the invention and that it is intended to cover all changes and modifications of the example of the invention herein chosen for the purposes of the disclosure which do not constitute departures from the spirit and scope of the invention.

The invention claimed is:

1. A driving clutch comprising,
    a rotating power shaft,
    a rotatable driven member,
    a primary wrap spring,
    and a secondary wrap spring, said primary and secondary springs being tandemly mounted and embracing said power shaft and having coils wound in a common direction with adjacent ends secured in said driven member whereby said primary spring is adapted to couple said power shaft to said driven member and said secondary spring is operative to couple said driven member to said shaft when said driven member attempts to lead said shaft.

2. A positive action clutch comprising a continuously driven shaft,
    a primary coiled spring wrapped about said shaft, said primary spring having two end portions,
    a secondary coiled spring wrapped about said shaft, said secondary spring having two end portions,
    a cam rotatably mounted on said shaft, said springs being wound in the same direction and having a normal diameter less than that of said driven shaft, the adjacent end portions of said springs being secured to said cam,
    and interposer means for normally restraining the other end portion of said primary spring from wrapping to effect clutch disengagement and operable to release said other end portion to effect clutch engagement, said adjacent end portion of said secondary spring secured to said cam causing said secondary spring to wrap about said driven shaft whenever the speed of said cam exceeds the speed of said driven shaft.

3. A clutch as recited in claim 2 wherein said cam is provided with a slot and wherein said adjacent spring ends are bent off and extend into said slot thereby connecting said springs and cam.

References Cited

UNITED STATES PATENTS 3,337,015   8/1967   Wagner _____ 192—48

CARLTON R. CROYLE, *Primary Examiner.*

C. M. LEEDOM, *Assistant Examiner.*